United States Patent
Johnson, III et al.

(10) Patent No.: US 9,648,705 B2
(45) Date of Patent: May 9, 2017

(54) INTELLIGENT LAMP HEAD ASSEMBLIES, LIGHT SOURCES INCLUDING INTELLIGENT LAMP HEAD ASSEMBLIES, AND METHODS OF OPERATING THE SAME

(71) Applicant: Heraeus Noblelight America LLC, Gaithersburg, MD (US)

(72) Inventors: William E. Johnson, III, Burke, VA (US); Darrin Leonhardt, Gaithersburg, MD (US); Mahmood Gharagozloo, Gaithersburg, MD (US); Arunachalam Jawahar, Thenkalam (IN)

(73) Assignee: Heraeus Noblelight America LLC, Gaithersburg, MD (US)

(*) Notice: Subject to any disclaimer, the term of this patent is extended or adjusted under 35 U.S.C. 154(b) by 39 days.

(21) Appl. No.: 14/994,882

(22) Filed: Jan. 13, 2016

(65) Prior Publication Data

US 2016/0212827 A1    Jul. 21, 2016

Related U.S. Application Data

(60) Provisional application No. 62/103,932, filed on Jan. 15, 2015, provisional application No. 62/103,944, filed on Jan. 15, 2015.

(51) Int. Cl.
*H05B 37/02* (2006.01)
*H05B 33/08* (2006.01)

(52) U.S. Cl.
CPC ....... *H05B 37/0227* (2013.01); *H05B 33/089* (2013.01); *H05B 33/0848* (2013.01); *H05B 33/0851* (2013.01); *H05B 33/0866* (2013.01)

(58) Field of Classification Search
None
See application file for complete search history.

(56) References Cited

U.S. PATENT DOCUMENTS

| | | | |
|---|---|---|---|
| 4,710,638 A | 12/1987 | Wood | |
| 8,575,861 B1 | 11/2013 | Gordin et al. | |
| 8,872,137 B2 | 10/2014 | Childers | |
| 2011/0147356 A1 | 6/2011 | Leonhardt et al. | |
| 2013/0270998 A1* | 10/2013 | Pi | H05B 33/0863 315/51 |
| 2013/0293877 A1 | 11/2013 | Ramer et al. | |
| 2014/0014857 A1 | 1/2014 | Martinez et al. | |
| 2014/0067290 A1 | 3/2014 | Hsu et al. | |
| 2014/0131755 A1 | 5/2014 | Owen et al. | |

FOREIGN PATENT DOCUMENTS

| | | |
|---|---|---|
| DE | 19905709 | 8/2000 |
| TW | 201120360 | 6/2011 |

OTHER PUBLICATIONS

International Search Report for PCT/US2016/013410, dated Apr. 7, 2016.

* cited by examiner

*Primary Examiner* — Jany Richardson
(74) *Attorney, Agent, or Firm* — Stradley Ronon Stevens & Young, LLP

(57) ABSTRACT

A lamp head assembly is provided. The lamp head assembly includes a plurality of arrays of light producing elements; a driver circuit configured to provide energy to each of the plurality of arrays; and a microprocessor for controlling operation of the driver circuit.

20 Claims, 4 Drawing Sheets

INTELLIGENT LAMP HEAD ASSEMBLIES, LIGHT SOURCES INCLUDING INTELLIGENT LAMP HEAD ASSEMBLIES, AND METHODS OF OPERATING THE SAME

CROSS-REFERENCE TO RELATED APPLICATIONS

This application claims the benefit of U.S. Provisional Patent Application No. 62/103,932, filed Jan. 15, 2015, and of U.S. Provisional Patent Application No. 62/103,944, filed Jan. 15, 2015, the content of both of which is incorporated herein by reference in its entirety.

FIELD

The invention relates to light source such as UV light sources, and more particularly, to intelligent lamp head assemblies for such light sources, and methods of operating the same.

BACKGROUND

Certain lamp systems, sometimes referred to as lamp head assemblies, include light producing elements (e.g., ultraviolet radiation LEDs, also known as UV LEDs, etc.). Often, these light producing elements are arranged in a plurality of arrays, each of the arrays including a plurality of the light producing elements. Such lamp systems are used in connection with many applications such as, for example, UV curing applications (e.g., UV curing of inks, bonding agents such as adhesives, coatings, etc.).

Conventional lamp systems including a plurality of arrays of light producing elements face certain challenges. As an initial matter, during maintenance, troubleshooting, etc. it can be challenging to locate certain information related to elements of the lamp system (e.g., related to the light producing elements). That is, a user can not simply look at an assembled array of light producing elements and know which parts are included in the array.

Such lamp systems tend to draw a large magnitude of electrical current to operate the plurality of light producing devices. This level of electrical current creates safety challenges in the in situ investigation or troubleshooting of issues related to the operation of the lamp systems. Furthermore, identical looking lamp systems can have extremely different operating requirements, increasing the potential for damage due to accidental over-voltage or over-current conditions.

Thus, it would be desirable to provide improved lamp head assemblies, and methods of operating the lamp head assemblies.

SUMMARY

According to an exemplary embodiment of the invention, a lamp head assembly is provided. The lamp head assembly includes a plurality of arrays of light producing elements; a driver circuit configured to provide energy to each of the plurality of arrays; and a microprocessor for controlling operation of the driver circuit.

According to another exemplary embodiment of the invention, another lamp head assembly is provided. The lamp head assembly includes: (a) a plurality of arrays of light producing elements; and (b) a static memory device including information related to each of the plurality of arrays.

According to yet another exemplary embodiment of the invention, a method of operating a lamp head assembly is provided. The method includes the steps of: (a) providing a lamp head assembly including a plurality of arrays of light producing elements, the lamp head assembly including a driver circuit configured to provide energy to each of the plurality of arrays; and (b) controlling the driver circuit using at least one microprocessor included in the lamp head assembly.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1:
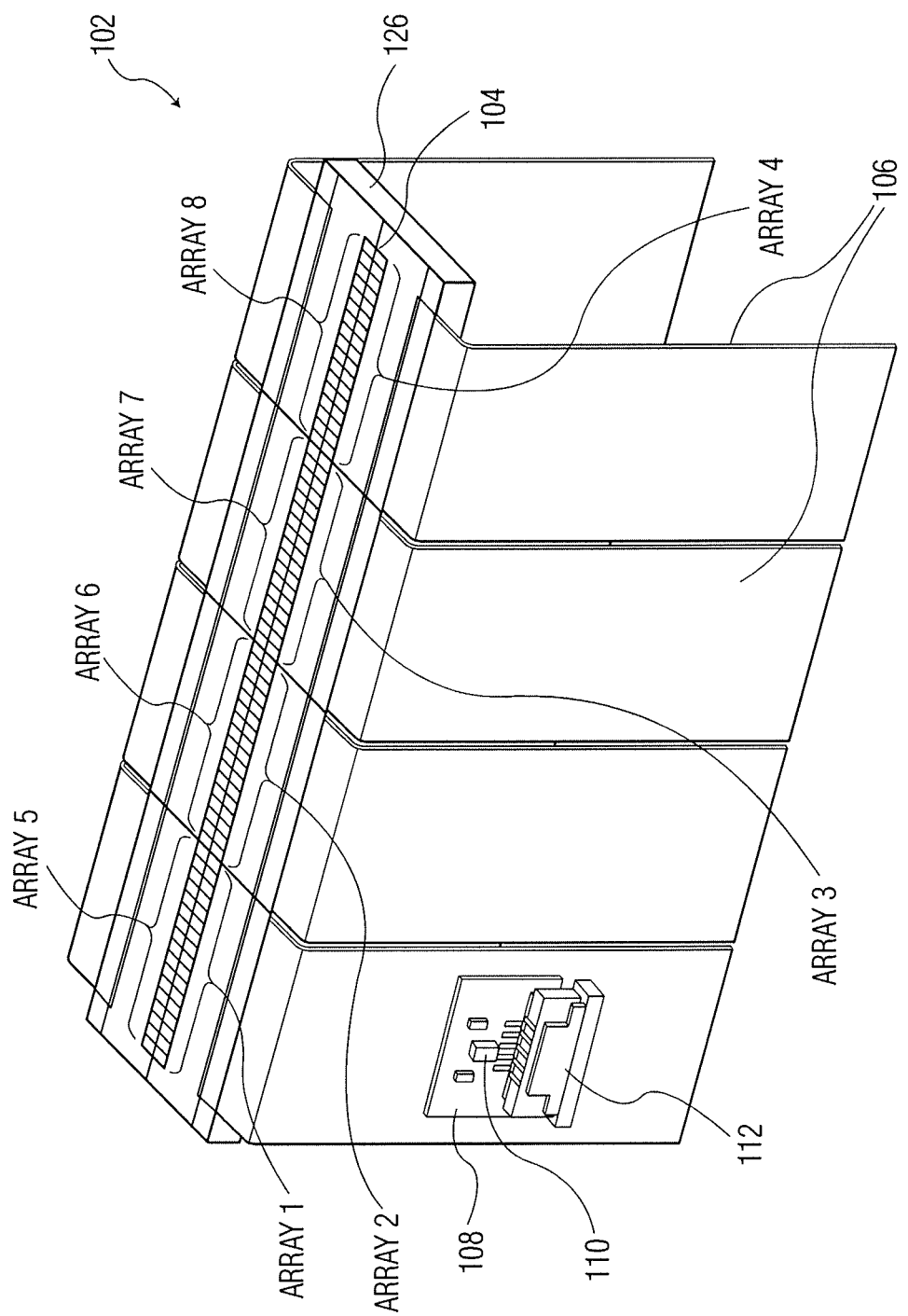
FIG. 1 is a perspective view of a lamp head assembly in accordance with an exemplary embodiment of the invention.

As used herein, the terms "processor" and "microprocessor" are used interchangeably, and shall be broadly construed to refer to any device including a processing unit (e.g., a central processing unit) or other hardware that executes computer program instructions. Examples of "processors" and "microprocessors" include microcontrollers, digital signal processors (DSPs), programmable logic controllers (PLCs), computers, etc. As is understood by those skilled in the art, "processors" and "microprocessors" may include elements such as random access memory (RAM), read only memory (ROM), and peripherals.

Embodiments of the invention relate to one or more intelligent arrays of light producing devices (e.g., arrays of UV LEDs), whereby manufacturing data and characteristics of the light producing devices are included in local memory using identification techniques such as radio frequency identification (i.e., RFID), electrically erasable programmable read-only memory (i.e., EEPROM), barcode reading identification, and/or other forms of static memory accessible at each array of light producing elements (or at another area of the lamp head assembly).

One specific embodiment relates to building a hybrid array of light producing devices with different wavelengths. According to the invention, methods of identifying characteristics specific to each array of light producing devices are enabled. In such a hybrid example, each array of light producing devices may be driven (e.g., using a microprocessor controlled driver circuit) with different currents, or may be controlled independently (e.g., turning arrays on and off individually).

In one embodiment of the invention, attributes of an array of light producing devices may be converted to a unique number (e.g., a reference part number), for example, associated with a radio frequency identification (RFID) device. The RFID device may identify one or more specific parts populated on an array, thereby enabling a user (e.g., a stock room, a production user, etc.) with the ability to distinguish one array from another. Such an RFID device may be permanently attached to the array, or a component of an associated lamp head assembly (e.g., a flex circuit included in the lamp head assembly). Of course, other devices (e.g., a barcode, an EEPROM device, etc.) may be used to associate part numbers for inventory and manufacturing management.

Further, using an EEPROM or a similar device may offer even more features. The ability to identify the types of devices on the array can be propagated to one or more driver circuits to apply specific operational properties. Therefore, with this intelligence, one driver circuit (or multiple driver circuits) can independently drive multiple arrays with different characteristics or for different applications. Such an EEPROM may also be used by a customer (or other user) for technical services with the ability to distinguish its characteristics, thus insuring the customer receives appropriate maintenance and spares support.

Thus, by providing an intelligent array(s) within an intelligent lamp head, each individual array may be controlled independently (e.g., through actual operational control, or turning on/off) rather than treating all arrays the same. That is, at least one of the plurality of arrays may be configured to produce light at a different wavelength than others of the plurality of arrays. In such a case, the output of the driver circuit is different for the at least one of the plurality of arrays as compared to others of the plurality of arrays. A microprocessor controls the driver circuit to provide different energy levels to each of the plurality of arrays.

Further, by providing a permanent device integrated at the array(s), direct tracking of the array assembly and history may be enabled.

Exemplary benefits of an intelligent array include, for example: distinguishment of one array from other arrays in monitoring and control; detailed data on the lamp head assembly to assist in product life management characterization; traceability of each array; individual control for each array; inventory control; smart manufacturing control; warranty confirmation; availability of bin information; availability of lot information; date coding; data related to location of devices on an array; availability of device information, such as device manufacturer, hours of operation, date of array assembly; data related to die bonding, die attached paste type, wire size in wire bonding size; information related to the array assembler including serial number, part number, and individual current control information for each array; and data related to a silicon curing profile and material.

According to further embodiments of the invention, a microprocessor may be integrated into a lamp head assembly, where the lamp head assembly may further include one or more static memory devices (e.g., flash memory devices, EEPROM devices, etc.). With the addition of the microprocessor (e.g., a microcontroller), additional circuits may be provided to the lamp head assembly to support additional functionality. For example, an analog to digital transceiver, a temperature sensor, current sensing circuitry, voltage sensing circuitry, UV detection circuitry, etc. may be provided on a circuit board along with the microprocessor.

These sensors offer real time measurements of the various characteristics, which may be used in connection with the microprocessor, and in connection with a static memory device, to determine if an array (or an entire lamp head assembly) is within acceptable operational specifications—or if an alarm or other undesirable condition is present. Inclusion of a static memory device enables management of an operational history of a lamp head assembly including, for example, data indicating the numer of hours that a lamp head assembly (or an array of light producing elements within the lamp head) has been running. Information may be provided (e.g., via a communications cable coupled to a communications link(s) at the lamp head assembly, or via a wireless communication link, etc.) to a remote processor such as a CPU of a power supply.

In a specific embodiment, a microcontroller is integrated on each of a pair of driver circuit boards positioned on opposite sides of a body portion of a lamp head assembly. Each of the driver circuit boards is dedicated to drive multiple channels/arrays of the lamp head assembly. Each driver circuit board may include elements such as: (a) data acquisition chip(s), sometimes referred to as conditioning circuitry, for acquiring and "conditioning" sensor inputs such as voltage, current, uv detection, and temperature; (b) a transceiver chip for providing a communication link such as a communication interface (RS-485/RS-422, CAN or any other communication protocol); (c) a static memory device such as an EEPROM device(s); (d) a processor, such as a microcontroller, to collect all of the inputs, conditions, etc., and to report such information back to another processor (such as the light source controller which may be the CPU of the power supply). The processor may perform additional tasks such as, for example, receiving an input voltage and communicating with a remote processor, to compensate for voltage drop due to excessive cable lengths, which can harm lamp performance. Further, the processor may provide additional controls to the lamp head assembly such as the independent controls of individual arrays within the lamp head assembly.

Significant benefits are achieved through the various embodiments of the invention such as, for example: real time monitoring of the "health" of the lamp head assembly; control and monitor of intelligent arrays of light producing elements within the lamp head assembly; enablement of the means to build a robust master slave configuration; enablement of machine to machine communication; enablement of the ability to hot swap lamp assemly modules; logging of lamp head assembly hours to ensure warranty integrity; enablement of long cable installations due to active voltage monitoring; improved scheduled maintenance capabilities because of real time monitoring; collection of data using sensors over time in the determination of the product life cycle; providing the monitoring information in connection with a user interface (e.g., a GUI), where the interface may be passive and simply provide information such as values of sensed characteristics of the lamp head assembly, or where the interface may also be active and include some control capabilities of the lamp head assembly; and enablement of the ability to turn devices off and on to extend the life of the devices.

Referring now to FIG. 1, a lamp head assembly 102 includes a heat exchanger block 126 which supports a plurality of light producing elements 104. For example, the plurality of light producing elements 104 may be part of a UV LED strip (or another arrangement of light producing devices) mounted to the heat exchanger block 126. As shown in the example of FIG. 1, the plurality of light producing elements 104 are arranged in a plurality of groups referred to as array 1, array 2, array 3, array 4, array 5, array 6, array 7, and array 8. Heat exchanger block 126 may define a plurality of channels within its body portion configured to receive a cooling fluid (e.g., chilled water) for providing a cooling effect to remove heat produced by the plurality of light producing elements 104.

FIG. 1 also illustrates a plurality of flex circuits 106, one distributing electrical current to each of the arrays 1-8. As shown in FIG. 1, a flex circuit 106 adjacent array 1 includes a circuit board 108 including a static memory device 110 and a cable connector 112. Static memory device 110 may be, for example, an EEPROM device, an RFID tag, a bar code, among other devices. Cable connector 112 may be connected to a driver circuit (e.g., a driver circuit board) for providing the electrical power to be distributed to power the light producing elements 104 of array 1. Information included in static memory device 110 may include, for example, manufacturing data and characteristics related to light producing elements of array 1.

Figure 2:
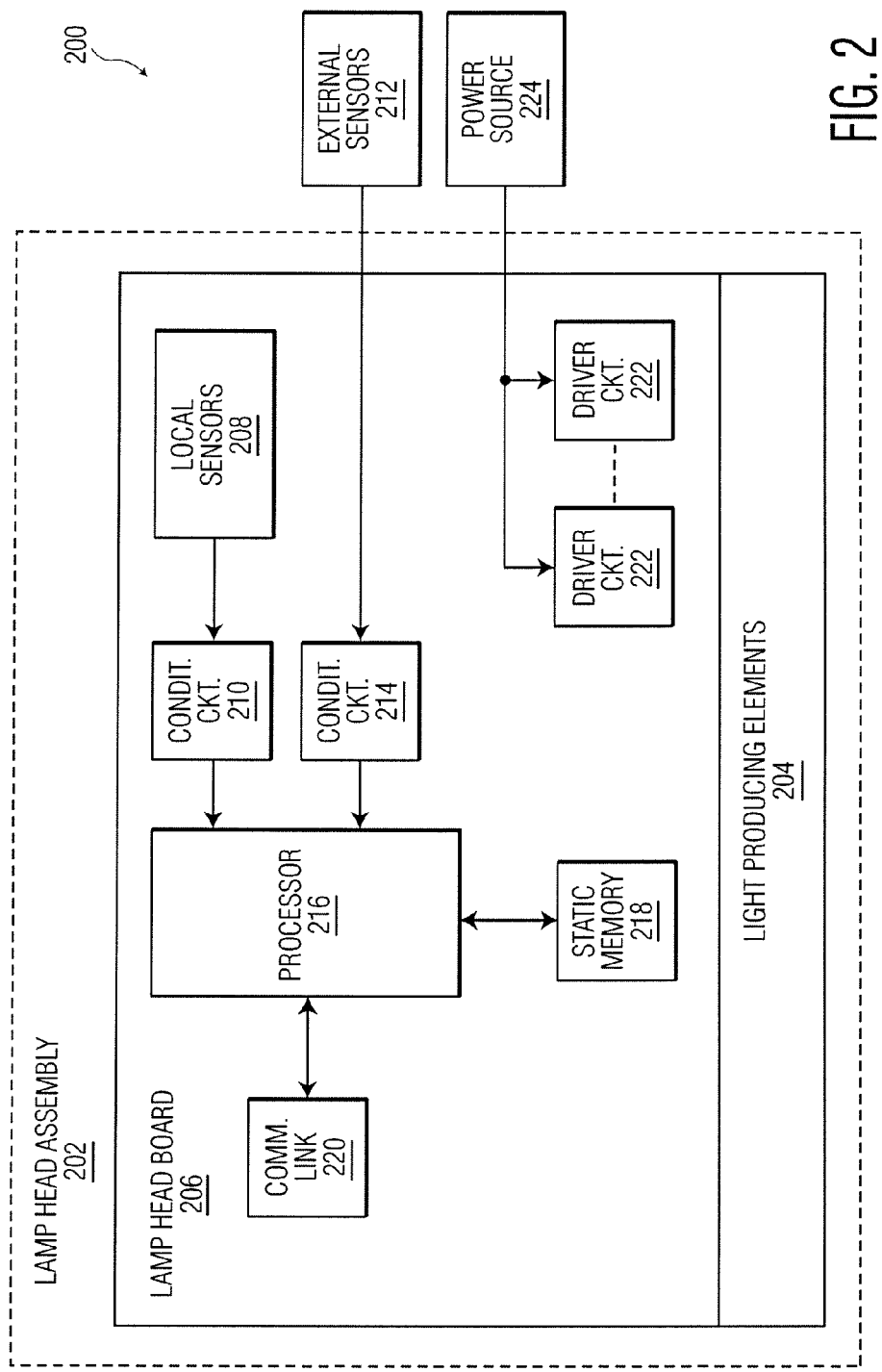
FIG. 2 is a block diagram of a light source system in accordance with an exemplary embodiment of the invention.

FIG. 2 is a block diagram of a light source 200 including a lamp head assembly 202, external sensors 212, and a power source 224 (e.g., a power supply). Lamp head assemly 202 includes a lamp head board 206 and a plurality of light producing elements 204 (e.g., such as the plurality of light producing elements 104, such as UV LEDs).

Lamp head board 206 includes a plurality of circuit elements including local sensors 208, signal conditioning circuit(s) 210, signal conditioning circuit(s) 214, processor 216, static memory device 218, communication link 220, and driver circuits 222. Driver circuits 222 are configured to provide energy to the light producing elements 204 (which may be arranged in a plurality of arrays, as in FIGS. 1 and 3). Electrical energy is provided to driver circuits 222 by power source 224 (e.g., a power supply). Processor 216 controls operation of each of the driver circuits 222.

A static memory device 218 includes information related to each of the plurality of arrays (the information included in the static memory device is accessible by the microprocessor, and is used to operate the driver circuit). The information included in static memory device 218 may include: LED IV characteristic curves where the light producing elements are LEDs; other electrical characteristics of the light producing elements; and different driving characteristics for ones of the arrays of light producing elements where at least one of the plurality of arrays is configured to produce light at a different wavelength and/or at a different energy level than others of the plurality of arrays, etc.).

A plurality of local sensors 208 (i.e., local to the lamp head assembly) sense characteristics of lamp head assembly 202 and communicate such sensed characteristics to processor 216 through conditioning circuit 210. Such sensors 208 may include, for example: voltage sensors, current sensors, and temperature sensors measuring the relevant characteristic at the LED array (at the light producing elements 204); and/or UV energy sensors that independently measure the UV output of the LED array locally, etc. Likewise, a plurality of external/remote sensors 212 (i.e., remote from the lamp head assembly) sense other characteristics (e.g., UV energy sensors, temperature sensors, spectral output sensors, etc., any of which may be located remote from the lamp head assembly such as elsewhere in light source 200 or near the target) of light source 200 and communicate such sensed characteristics to processor 216 through conditioning circuit 214.

Figure 3:
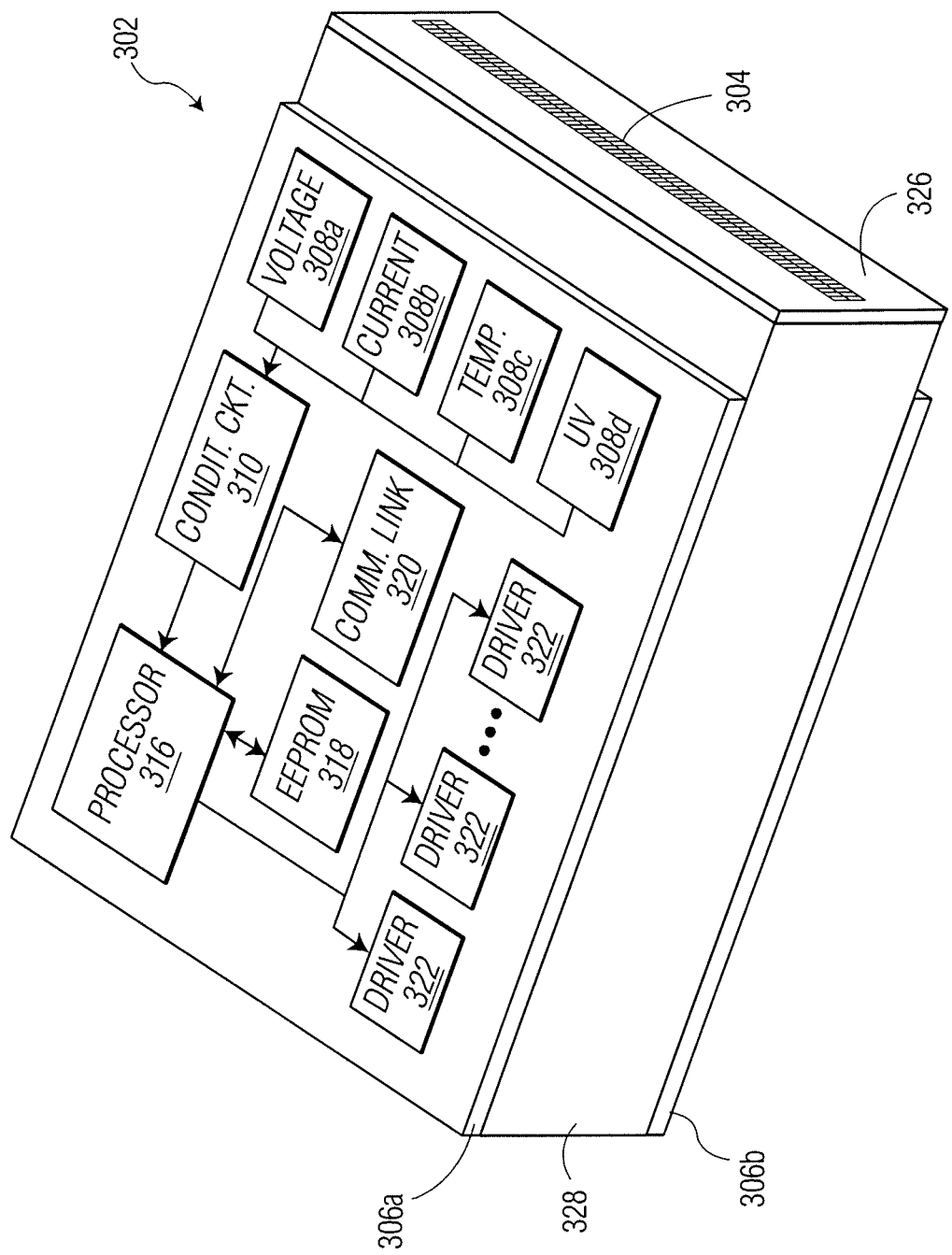
FIG. 3 is a block diagram perspective view of a lamp head assembly in accordance with an exemplary embodiment of the invention.

Lamp head assemblies according to the invention may take a number of forms. FIG. 3 illustrates a block diagram of an exemplary lamp head assembly 302. Lamp head assembly 302 includes a body portion 328, and a heat exchanger element 326 coupled to body portion 328. A plurality of light producing elements 304 are provided on heat exchanger element 326 (similar to light producing elements 104, arranged in a plurality of arrays, as shown in FIG. 1). Body portion 328 may house a cooling fluid distribution system for providing a cooling fluid to heat exchanger element 326 for providing a cooling effect to the light producing elements 304. A first circuit board 306a is provided on a first side of body portion 328, and a second circuit board 306b is provided on a second side of body portion 328. While two circuit boards 306a, 306b are provided in the example of FIG. 3, it is understood that any number of circuit boards (e.g., one, two, four, etc.) may be utilized as desired. The elements on first circuit board 306a are visible in FIG. 3; while the elements on second circuit board 306b are not visible in FIG. 3, such elements may be the same (or substantially similar to) those visible on first circuit board 306a. The elements shown on circuit board 306a are similar to those described above with respect to FIGS. 1-2.

Circuit board 306a including drivers 322 (e.g., drive circuits 322) configured to provide energy to the light producing elements 304 (which may be arranged in a plurality of arrays, as in FIG. 1). Electrical energy is provided to drivers 322 by a power source/supply (not shown). Processor 316 controls operation of each of drivers 322.

A static memory device 318 (shown as an EEPROM 318) includes information related to light producing elements arranged in a plurality of arrays (the information included in the static memory device is accessible by the microprocessor, and is used to operate the driver circuit). The information included in the static memory device may include: LED IV (current-voltage) characteristic curves where the light producing elements are LEDs; other electrical characteristics of the light producing elements; and different driving characteristics for arrays of light producing elements where at least one of the plurality of arrays is configured to produce light at a different wavelength and/or at a different energy level than other arrays of the plurality of arrays, etc.

A plurality of local sensors 308a, 308b, 308c, and 308d (i.e., local to lamp head assembly 302) sense characteristics of lamp head assembly 302 and communicate such sensed characteristics to processor 316 through conditioning circuit 310. The exemplary (and non-limiting) sensors include a voltage sensor 308a, a current sensor 308, a temperature sensor 308c, and a UV sensor 308d. While not shown in FIG. 3, external sensors (such as sensors 212 shown in FIG. 2) are contemplated in the embodiment of FIG. 3, along with corresponding conditioning circuitry (such as conditioning circuit 214 shown in FIG. 2) for such external sensors.

Communication link 320 (in communication with processor 316) enables communication of information relevant to lamp head assembly 302, such as sensed information, with a remote processor (e.g., a remote processor of a power source for providing energy to the light producing elements, such as power source 224 shown in FIG. 2).

Software (e.g., including one or more algorithms accessible by processor 316) is compiled (e.g., real time). In operation of this software, values of information sensed by one or more of the sensors 308a, 308b, 308c, and 308d (where such values may be altered, for example, mathematically manipulated) is compared to predetermined values by processor 316 (or by a remote processor). For example, the comparison may include a determination as to whether the value(s) fall within a predetermined range, or exceeds a predetermined threshold. In the event that the value falls into an alarm/interlock range, or exceeds an alarm/interlock threshold, data related to the sensed characteristic may be stored, for example, in static memory device 318.

Figure 4:
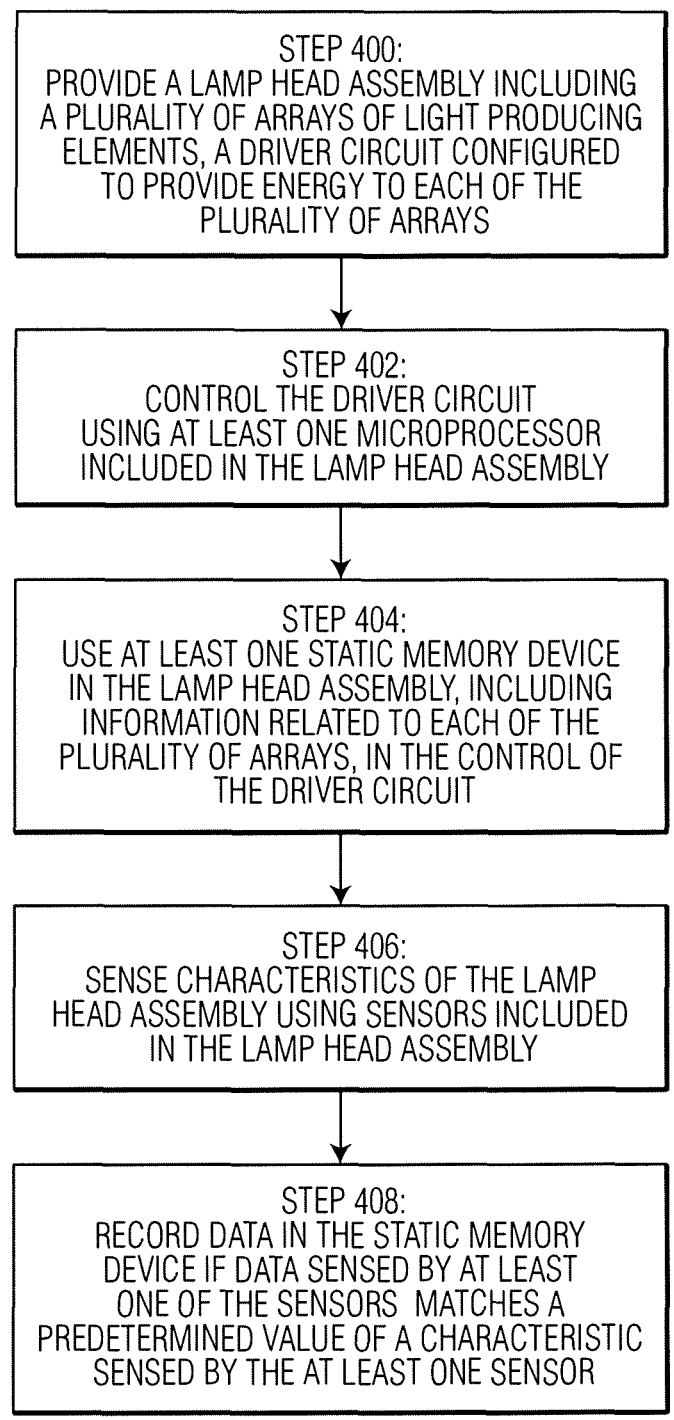
FIG. 4 is a flow diagram illustrating a method of operating a lamp head assembly in accordance with an exemplary embodiment of the invention.

FIG. 4 is a flow diagram in accordance with certain exemplary embodiments of the invention. As is understood by those skilled in the art, certain steps included in the flow diagram may be omitted; certain additional steps may be added; and the order of the steps may be altered from the order illustrated.

Referring specifically to the flow diagram in FIG. 4, a method of operating a lamp head assembly is provided. At Step 400, a lamp head assembly including a plurality of arrays of light producing elements is provided, where a driver circuit is configured to provide energy to each of the plurality of arrays. For example, FIG. 3 illustrates lamp head assembly 302 including a plurality of light producing elements 304. The light producing elements may be arranged into a plurality of arrays (e.g., see FIG. 1).

At Step 402, the driver circuit is controlled using at least one microprocessor included in the lamp head assembly. For example, processor 316 controls operation of each driver circuit 322 shown in FIG. 3, where each driver circuit 322 provides energy to one or more of the plurality of arrays of light producing elements 304.

At Step 404, at least one static memory device (e.g., see EEPROM 318 in FIG. 3, static memory 218 in FIG. 2, etc.) of the lamp head assembly, including information related to each of the plurality of arrays, is used in the control of the driver circuit. At Step 406, characteristics of the lamp head assembly are input using sensors (e.g., see sensors 308a, 308b, 308c, and 308d in FIG. 3; local sensors 208 and external sensors 212 in FIG. 2) included in the light source. At Step 408, data is recorded in the static memory device if data sensed by at least one of the sensors matches a predetermined value of a characteristic sensed by the at least one sensor.

According to certain exemplary embodiments of the invention, and based on the desired (e.g., optimal) performance of the system, an acceptable (or unacceptable) threshold value may be established for each sensor characteristic, or an acceptable (or unacceptable) range may be established for each sensor characteristic. Real time data is collected by the plurality of sensors included in the lamp head assembly (e.g., voltage sensors, current sensors, temperature sensors, UV sensors, etc.), where the data from the sensors may be stored in memory local to the lamp head assembly (e.g., a static memory device such as an EEPROM) and/or may be sent to the processor (e.g., a microcontroller) on a printed circuit board included in the lamp head assembly. As provided above, the data from the sensors (which may be reconditioned, reformatted, aggregated, mathematically manipulated, etc.) may then be transmitted via cable to a remote processor (e.g., the central processing unit of the power supply) that compares the data to the predetermined criteria for the specific characteristic being sensed. If the sensor data is outside of an acceptable predefined value (as determined using a threshold, a range, etc.), software may be used to (i) initiate a warning through a user interface (e.g., a graphical user interface, etc.), or (ii) engage an interlock to shut down at least a portion of the lamp head assembly. The determination of whether the sensor data is acceptable (and/or the initiation of a warning or engagement of an interlock) may be accomplished by a local processor (at the lamp head assembly) as opposed to the remote processor.

As illustrated and described herein, a static memory device (e.g., an EEPROM) is in communication with a processor at the lamp head assembly, where the static memory device includes information related to at least one of (i) read only data related to the lamp head assembly, including but not limited to information related to each of the plurality of arrays of light producing elements, and (ii) data written by the processor related to operation of the lamp head assembly. That is, as used herein, the term static memory device (including EEPROM) is intended to refer to a system that may include read only data, and memory for writing additional data. Read only data stored in a static memory device may include, for example, data related to each of the arrays of light producing elements such as IV characteristic curves, manufacturer data related to the light producing elements (e.g., bar codes, model numbers, service data, warranty data, inventory data, etc.) or similar information related to other parts of the lamp head assembly. Data written by a processor to the static memory device may include, for example, information related to the hours of operation of the lamp head assembly (and/or hours of operation of each arrays of light producing elements), data related to characteristics of the lamp head assembly sensed by one or more sensors, etc. A specific example of data that may be written by the processor to the static memory device may include information related to characteristics that exceed predetermined criteria (e.g., alarm conditions such as a high voltage condition, a high current condition, etc.).

While the invention is described primarily in connection with lamp head assemblies, the inveniton may also be considered as inventive light sources including the inventive lamp head assemblies.

It is understood that the use of certain terms herein in the singular may refer to the plural, and vice versa. For examples, the term "driver circuit" may refer to a plurally of driver circuits.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A lamp head assembly comprising:
   (a) a plurality of arrays of light producing elements;
   (b) a driver circuit configured to provide energy to each of the plurality of arrays;
   (c) a microprocessor for controlling operation of the driver circuit; and
   (d) one or more sensors in communication with the microprocessor for sensing characteristics of the lamp head assembly,
   wherein values corresponding to information sensed by the one or more sensors are compared to predetermined values by the microprocessor to determine if the values (i) fall within at least one of an alarm or interlock range, or (ii) exceed at least one of an alarm or interlock threshold.

2. The lamp head assembly of claim 1 wherein the light producing elements are selected from the group consisting of UV LEDs and laser light producing elements.

3. The lamp head assembly of claim 1 wherein the driver circuit includes a plurality of driver circuits, each of the plurality of driver circuits being configured to provide energy to at least a portion of the plurality of arrays of light producing elements.

4. The lamp lead assembly of claim 1 further comprising a static memory device including information related to each of the plurality of arrays.

5. The lamp head assembly of claim 4 wherein the light producing elements are UV LEDs, and wherein the information included in the static memory device includes LED IV characteristic curves.

6. The lamp head assembly of claim 4 wherein the information included in the static memory device includes electrical characteristics of the light producing elements configured for use by the driver circuit to provide energy to each of the plurality of arrays.

7. The lamp head assembly of claim 4 wherein the information included in the static memory device is accessible by the microprocessor, and is used during operation of the driver circuit.

8. The lamp head assembly of claim 1 wherein at least one of the plurality of arrays is configured to produce light at a different wavelength than others of the plurality of arrays.

9. The lamp head assembly of claim 1 wherein an output of the driver circuit is different for at least one of the plurality of arrays as compared to others of the plurality of arrays.

10. The lamp head assembly of claim 1 wherein the microprocessor controls the driver circuit to provide different energy levels to each of the plurality of arrays.

11. The lamp head assembly of claim 1 further comprising a heat exchanger block for supporting the plurality of light producing elements the heat exchanger block defining a plurality of channels to receive a cooling fluid.

12. The lamp head assembly of claim 1 wherein the characteristics sensed by the plurality of sensors include at least one of a voltage level, a current level, a temperature, and a UV characteristic.

13. The lamp head assembly of claim 1 wherein the microprocessor is configured to record data in a static memory device of the lamp head assembly if a characteristic sensed by a sensor of the lamp head assembly is outside of an acceptable predefined value.

14. The lamp head assembly of claim 13 wherein the characteristic includes at least one of a voltage characteristic and a current characteristic.

15. The lamp head assembly of claim 1 wherein the microprocessor is in communication with a remote processor, the remote processor being located at a power supply configured to provide energy to the lamp head assembly for operating the plurality of arrays of light producing elements.

16. A lamp head assembly comprising:
(a) a plurality of arrays of light producing elements;
(b) a static memory device including information related to each of the plurality of arrays; and
(c) one or more sensors in communication with the microprocessor for sensing characteristics of the lamp head assembly,
wherein values corresponding to information sensed by the one or more sensors are compared to predetermined values stored in the static memory device to determine if the values (i) fall within at least one of an alarm or interlock range, or (ii) exceed at least one of an alarm or interlock threshold.

17. The lamp head assembly of claim 16 wherein the information included in the static memory device, and related to each of the plurality of arrays, includes at least one of manufacturing data of each of the plurality of arrays, and characteristics of each of the plurality of arrays.

18. A method of operating a lamp head assembly, the method comprising the steps of:
(a) providing a lamp head assembly including a plurality of arrays of light producing elements, the lamp head assembly including a driver circuit configured to provide energy to each of the plurality of arrays;
(b) controlling the driver circuit using at least one microprocessor included in the lamp head assembly;
(c) sensing at least one characteristic of the lamp head assembly using at least one sensor included in the lamp head assembly; and
(d) comparing, using the microprocessor, values corresponding to information sensed by the one or more sensors to predetermined values to determine if the values (i) fall within at least one of an alarm or interlock range, or (ii) exceed at least one of an alarm or interlock threshold.

19. The method of claim 18 further comprising a step of providing at least one static memory device in the lamp head assembly, the at least one static memory device including information related to each of the plurality of arrays, the at least one static memory device being used in the control of the driver circuit.

20. The method of claim 18 further comprising the step of (d) recording data in a static memory device of the lamp head assembly if data sensed by the at least one sensor matches a predetermined value of a characteristic sensed by the at least one sensor.

* * * * *